United States Patent [19]

Fisher

[11] Patent Number: 4,911,594

[45] Date of Patent: Mar. 27, 1990

[54] PUSH-NUT TYPE FASTENER

[75] Inventor: Charles K. Fisher, Belford, N.J.

[73] Assignee: TRW Inc., Cleveland, Ohio

[21] Appl. No.: 369,696

[22] Filed: Jun. 21, 1989

[51] Int. Cl.$^4$ .................... F16B 39/284; F16B 37/16
[52] U.S. Cl. .................................... 411/437; 411/247; 411/527; 411/941
[58] Field of Search ............... 411/288, 289, 290, 174, 411/175, 247, 525, 526, 527, 528, 529, 437, 941, 941.1

[56] References Cited

U.S. PATENT DOCUMENTS 1,161,317 11/1915 Kielland .............................. 411/247
2,351,065 6/1944 Poupitch ............................. 411/941
4,784,553 11/1988 Spat ..................................... 411/941

Primary Examiner—Neill R. Wilson
Attorney, Agent, or Firm—Fay, Sharpe, Beall, Fagan, Minnich & McKee

[57] ABSTRACT

A push-nut type fastener for use on a threaded stud comprises a thin planar metal plate having an aperture formed therethrough with its axis perpendicular to the plane of the plate. A first plurality of resilient fingers is formed integrally with the metal plate to extend radially inward from the periphery of the aperture at uniformly spaced locations with the inner ends of the fingers located generally on an imaginary circle having a diameter substantially less than the crest diameter but greater than the root diameter of the threaded stud. A second plurality of resilient finger members extends radially inward from the periphery of the aperture at locations intermediate the resilient fingers in the first plurality. The fingers in the second plurality are bent from the plane of the plate to extend outwardly therefrom and each finger in the second plurality terminates in a free end having a terminal edge which is on an imaginary cylinder coaxial with the aperture and of a diameter which is less than the crest diameter and greater than the pitch diameter of the stud. Moreover, each terminal edge extends on a helical path at a helix angle greater than the helix angle of the thread of the stud.

13 Claims, 1 Drawing Sheet

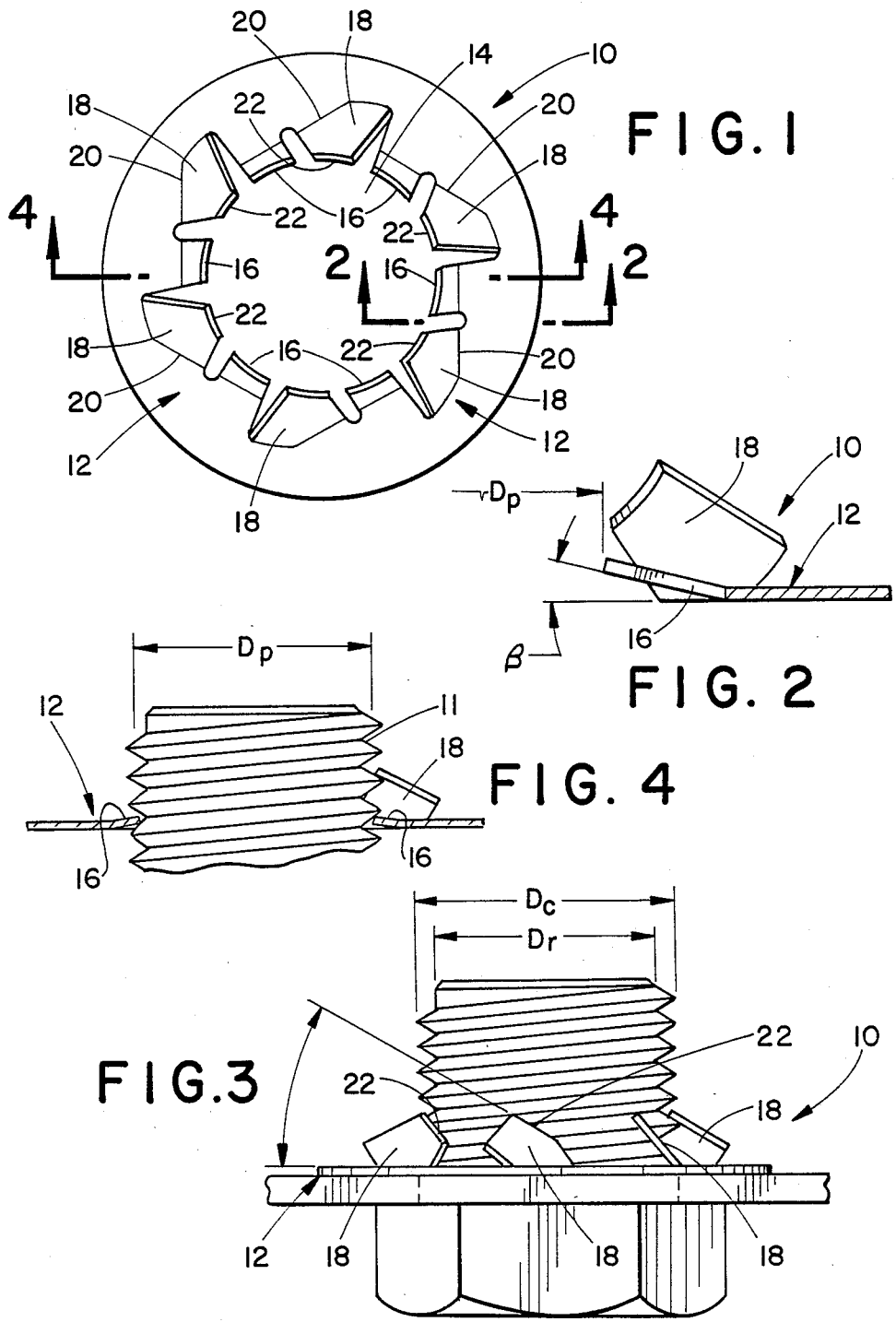

PUSH-NUT TYPE FASTENER

BACKGROUND OF THE INVENTION

The subject invention is directed toward the fastener art and, more particularly, to a push-on type sheet metal nut particularly intended for use on threaded studs.

Push-nut or push-on type sheet metal fasteners are well known and are widely used as an inexpensive and highly reliable replacement for various types of threaded nuts and collars. Often they are used as a retaining element on unthreaded studs or shafts. One common use for such fasteners is to temporarily retain partial assemblies in an assembled relationship until they are finally joined in the finished product. Likewise, the fasteners are used for retaining bolts and similar threaded devices in panels.

In many installations, the prior designs are entirely adequate and provide sufficient holding power for most needs. Currently, however, increased use of robotic units with their high speed accelerations and decelerations subject the assemblies to relatively high forces and have increased the demand placed on such fasteners. Accordingly, there is a need for a fastener which can provide increased holding power without increasing the difficulty of use.

BRIEF STATEMENT OF THE INVENTION

The subject invention overcomes the problems discussed above and provides a push-nut fastener which is simple to use but provides significantly increased holding power. Fasteners formed in accordance with the subject invention are particularly suited for use on threaded studs and bolts and have a high degree of stability. Moreover, they are capable of resisting both shock and significant acceleration and deceleration loading.

In particular, in accordance with the subject invention, there is provided a push-nut type fastener for use on threaded stud of the type having a continuous helical thread formed on the exterior thereof. The fastener comprises a thin planar metal plate having an aperture formed therethrough with the axis of the aperture perpendicular to the plane of the plate and having a effective maximum diameter substantially greater than the crest diameter of the threaded stud. A first plurality of resilient fingers are formed integrally with the metal plate and extend radially inward from the periphery of the aperture. The first plurality of resilient fingers are spaced relatively uniformly about the interior of the aperture with the radially inner ends of the fingers located generally on an imaginary circle having a diameter substantially less than the crest diameter of the stud but greater than its root diameter. A second plurality of resilient finger members are also formed integrally with the metal plate and extend radially inward from the periphery of the aperture at spaced locations uniformly about the aperture and intermediate the resilient fingers in the first plurality. The resilient fingers in the second plurality are bent from the plane of the plate to extend outwardly at an angle $\alpha$ to the axis of the fastener. Each resilient finger in the second plurality terminates in a free end having a terminal edge which is on an imaginary cylinder that is coaxial with the aperture and has a diameter which is less than the crest diameter and, preferably, greater than the pitch diameter of the stud. Each terminal edge of the fingers in the second plurality extends in a helical path at a helix angle greater than the helix angle of the helical thread form on the stud.

As can be appreciated, the combination of the two independent sets of resilient fingers produces a highly efficient centering and holding for the fastener. In particular, the fingers of the first set enter between adjacent threads and extend inwardly preferably at least to the pitch diameter of the threads. This provides a significant holding effect because of the positive engagement of the fingers between the threads. The second set of resilient fingers are arranged so as to have their terminal edges in positive biased engagement with the crest of the threads. In normal use, each of the second plurality of resilient fingers will be positively engaged with the crest of at least one thread. Because of the angle at which the second plurality of fingers engage the threads, a latching effect takes place if an attempt is made to withdraw the fastener axially from the stud.

Preferably, the helical paths on which the terminal edges of the fingers of the second plurality are located are of an opposite hand relative to the helix of the threads of the studs. This further increases the holding power since if an attempt is made to axially withdraw the fastener from the stud the opposite hand nature of the helixes causes the fingers to be driven into tighter engagement with the crests of the threads.

As can be appreciated, it is preferable if the terminal edges of the fingers in the second plurality have a relatively sharp, cleanly cut configuration so as to improve their ability to positively engage with the thread crests on the stud. In addition, it is preferable to have the fingers of both the first and second plurality bent in the same direction from the plane of the plate. The fingers of the first plurality are flat or bent only a slight amount so as to facilitate installation of the fastener. The fingers in the second plurality are, however, each bent outwardly at a substantially greater angle and preferably are sized such that the length of the free edge when considered in conjunction with the helix angle is such that it can never be bent or sprung into a position between adjacent threads.

As can be seen from the foregoing, a primary object of the subject invention is the provision of a push-nut type fastener for use on threaded studs and wherein engagement and gripping takes place both between the threads and on the thread crests.

A further object of the present invention is the provision of a push-nut type fastener wherein any attempt made to axially withdraw the fastener from the threaded stud produces an increase in the gripping forces between the threads and at least some of the resilient fingers.

A still further object of the invention is the provision of a fastener of the type described which is easy to install and which has a high resistance to shock and impact loading.

Yet another object of the invention is the provision of a fastener of the general type described which is of simple design and is easy to manufacture.

BRIEF DESCRIPTION OF THE DRAWING

The above and other objects and advantages will become apparent from the following description when read in conjunction with the accompanying drawings wherein:

FIG. 1 is a top plan view of a fastener formed in accordance with a preferred embodiment of the invention;

FIG. 2 is a greatly enlarged partial cross-sectional view taken on line 2—2 of FIG. 1;

FIG. 3 is a cross-sectional view taken on line 3—3 of FIG. 1 but showing the fastener installed on a threaded stud: and FIG. 4 is a cross-sectional view taken on line 4—4 of FIG. 1 but illustrating the fastener applied to a threaded stud in the manner of FIG. 3.

DETAILED DESCRIPTION OF THE PREFERRED EMBODIMENT

Referring more particularly to the drawings wherein the showings are for the purpose of illustrating a preferred embodiment of the invention only and not for the purpose of limiting same, FIG. 1 shows the overall arrangement of the preferred form of the fastener 10 formed as an independent fastener element particularly intended for use on a threaded stud or bolt having a standard 60 thread form. In the embodiment illustrated, the fastener is shown as having a conventional circular shape. It should, however, be understood that the fastener itself could be integrally incorporated in any type of associated structure and could have a variety of external, peripheral shapes and configurations.

Continuing with the description of the FIG. 1 embodiment, it will be noted that the fastener 10 is preferably formed by being stamped from a suitable sheet metal such as a relatively high carbon steel so that the resulting product can have a high degree of resilience and a relatively substantial hardness. In the subject embodiment, the fastener 10 comprises a relatively this, generally planar body 12 having a central opening 14 formed therethrough with the central axis of the opening extending generally perpendicular to the plane of the body 12. The opening 14 is formed so as to have an effective diameter and open peripheral area which is greater than the diameter of the threaded stud with which the fastener is intended to be used.

Formed integrally with the body 12 about the interior of the opening 14 and extending generally radially inward is a first plurality of resilient spring finger members 16. As shown, there are six of the fingers 16 and they are preferably spaced uniformly about the circumference of opening 14. Each of the fingers 16 in the first plurality terminate in free ends which have a generally concave end configuration and a length such that their inner free ends lie on an imaginary circle which is substantially equal in diameter to the pitch diameter of the threaded stud with which the fastener is intended to be used. This pitch diameter is illustrated as diameter $D_p$ in FIG. 4. In addition, as best shown in FIG. 2, each of the individual fingers 16 of the first plurality are preferably in the plane of the body 12 or bent outwardly therefrom by a relatively small angle $\beta$ in the range of 0 to 10 degrees. This slight bend can facilitate the installation of the fastener to the installed position shown in FIGS. 3 and 4. More particularly, the prebend in the fingers 16 can act to, in effect, provide a conical mouth for the opening 14 to center and locate the fastener on the outer end of the stud during installation. In addition, the prebend can act to limit the direction of installation of the fastener and allows it to be installed with an axial push-on motion.

As shown in FIG. 4, after installation is complete, the individual fingers 16 extend inwardly between adjacent threads. Associated with the first set of resilient spring fingers 16 and acting to further center and locate the fastener while increasing the holding power is a second set of individual spring fingers 18. Spring fingers 18 are formed inwardly of the periphery of the opening 14 and are located intermediate adjacent pairs of spring fingers 16. As best illustrated in finger 1, each of the spring fingers 18 have the shape shown and are bent outwardly from the plane of the body 12 along a respective bend line 20. Preferably, all of the fingers 18 are bent outwardly the same amount in the range of 40 to 60 degrees. The radially inner terminal end 22 of each of the spring fingers 18 is provided with a curved configuration and is shaped such that when the spring finger is bent to its final location, the terminal edge 22 extends along a helical path as best illustrated in FIG. 3. Preferably, the helix angle of the edge 22 for each of the spring fingers 18 is in the range of 30 to 50 degrees. Moreover, the helical path on which each of the terminal edges 22 lies is preferably on the surface of an imaginary cylinder having a diameter slightly less than the crest diameter $D_c$ of the stud 11 on which the fastener is to be installed. It should also be noted that the length of the terminal edge 22 of each of the spring fingers 18 of the second plurality is at least as great and preferably at least slightly greater than the distance between adjacent thread crests when measured on the helical path of the terminal edges 22. This assures that when installed in operating position, the terminal edges are in engagement with at least one thread crest.

As can be appreciated, the second plurality of spring fingers 18 function to locate the fastener concentrically on the threaded stud 11. Additionally, the arrangement of the spring fingers 18 relative to the fastener surface and threads assures that there is a positive engagement with the terminal edges. For this reason, and to increase the holding power, each of the spring fingers 18 has substantial resiliency and is bent to a position wherein the terminal edges are on the diameter of a cylinder slightly smaller than the crest diameter of the stud 11. Thus, when installed, the individual spring fingers 18 act to produce a substantial bias radially inward to produce an initial positive gripping of the stud. The location, shape and inclination of these spring fingers results in increasing engagement between the spring fingers 18 and the crests of the threads when an attempt is made to pull the fastener 10 axially off the stud. Installation (in a downward direction as viewed in FIG. 3) is, relatively simple and requires only moderate force because of the prebend and initial positioning of the various spring fingers.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

What is claimed is:

1. A push nut type fastener for use on a threaded stud having a continuous helical thread formed on the exterior thereof, said spiral thread having a crest diameter $D_c$ and a pitch diameter $D_p$, said fastener comprising;
    a thin planar metal plate having an aperture formed therethrough, said aperture having an axis perpendicular to the plane of said plate and maximum diameter substantially greater than $D_c$;
    a first plurality of resilient fingers formed integrally with said metal plate and extending radially inward from the periphery of said aperture, said first plurality of resilient fingers being spaced relatively uniformly about the interior of said aperture with the radially inner ends of said fingers locate generally on an imaginary circle having a diameter less than $D_c$;

a second plurality of resilient finger members formed integrally with said metal plate and extending radially inward from the periphery of said aperture, said resilient fingers of said second plurality being spaced relatively uniformly about said aperture at locations intermediate said resilient fingers in said first plurality, said resilient fingers in aid second plurality being bent from the plane of said plate to extend outwardly therefrom at an angle $\alpha$ to said axis, each said resilient finger in said second plurality terminating in a free end having a terminal edge which is on an imaginary cylinder which is coaxial with said aperture and has a diameter which is less than $D_c$ and greater than $D_p$, each said terminal edge extending on a helical path at a helix angle greater than the helix angle of the helical thread formed on said stud.

2. The fastener of claim 1 wherein said first plurality of fingers have their radially inner ends located on an imaginary circle having a diameter substantially equal to $D_p$.

3. The fastener of claim I wherein said terminal edge of each finger of said second plurality of fingers has a length substantially greater than the pitch of said thread on said stud.

4. The fastener of claim 1 wherein the helical paths on which the terminal edge of each finger of said second plurality of fingers extending are of opposite hand relative to the helix of the threads of said stud.

5. The fastener of claim 1 wherein said resilient fingers of said first plurality are bent from the plane of said metal plate in the same direction as said fingers of said second plurality.

6. The fastener of claim 1 wherein said resilient fingers of said second plurality are bent outwardly from the plane of said plate at an angle in the range of approximately 30 to 60 degrees.

7. The fastener of claim 6 wherein said resilient fingers of said second plurality each have their respective terminal edge extending at the same helix angle.

8. In combination, a push nut type fastener engaged on a threaded stud having a longitudinal axis and continuous helical thread;

said fastener comprising a thin planar metal plate having an aperture formed therethrough with the axis of the aperture extending perpendicular to the plane of said plate member and being general coextensive with the axis of said stud, a first plurality of resilient fingers formed integrally with said metal plate member and extending radially inwardly of the periphery of said aperture at circumferentially spaced locations, said resilient fingers terminating in free ends located on an imaginary circle having a diameter less than the crest diameter of said threaded stud with each said free end located between adjacent threads on said stud, a second plurality of resilient fingers extending radially inwardly about the periphery of said aperture at uniformly spaced locations intermediate said resilient fingers of said first plurality, each resilient finger in said second plurality being bent from the plane of said plate and terminating in a terminal edge which lies on a helical path having a helix angle substantially greater than the helix angle of said helical thread formed on said threaded stud with each said helical path lying on the surface of an imaginary cylinder which is coaxial with the axis of the aperture and which includes the crests of the helical thread of said stud each said resilient finger in said second plurality having a bias radially toward said stud and biasing its respective terminal edge into engagement with said crest of the helical thread on said stud.

9. The combination as defined in claim 8 wherein said terminal edges on said second plurality of resilient fingers have a length such that each said terminal edge engages at least two crests on said thread.

10. The termination as defined in claim 8 wherein each said terminal edges lie on helical paths which spiral in a direction opposite to the direction of spiral of said thread on said threaded stud.

11. The combination as defined in claim 10 wherein said terminal edges are all located on helical paths having the same helix angle.

12. The combination as defined in claim 11 wherein said fingers of said second plurality are all bent from the plane of said plate at the same angle.

13. The combination as defined in claim 12 wherein said fingers of said second plurality are each located between adjacent pairs of fingers of said first plurality.

* * * * *